(12) United States Patent
Luz et al.

(10) Patent No.: US 8,761,834 B2
(45) Date of Patent: Jun. 24, 2014

(54) METHOD AND APPARATUS FOR ANTENNA SELECTION AND POWER CONTROL IN A MULTIPLE INPUT MULTIPLE OUTPUT WIRELESS COMMUNICATION SYSTEM

(75) Inventors: Yehuda Y. Luz, Buffalo Grove, IL (US); Jiangnan Jason Chen, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 417 days.

(21) Appl. No.: 12/544,463

(22) Filed: Aug. 20, 2009

(65) Prior Publication Data
US 2010/0166098 A1    Jul. 1, 2010

Related U.S. Application Data

(60) Provisional application No. 61/141,736, filed on Dec. 31, 2008.

(51) Int. Cl.
| | |
|---|---|
| *H04M 1/00* | (2006.01) |
| *H04B 7/06* | (2006.01) |
| *H04B 7/04* | (2006.01) |

(52) U.S. Cl.
CPC ............ *H04B 7/0689* (2013.01); *H04B 7/0413* (2013.01); *H04B 7/0639* (2013.01); *H04B 7/0691* (2013.01)
USPC ......... 455/561; 455/562.1; 455/101; 455/103

(58) Field of Classification Search
CPC ..... H01Q 1/246; H04W 84/08; H04B 7/0613; H04B 7/0615; H04B 7/0617
USPC ........................................................ 455/561
See application file for complete search history.

(56) References Cited

U.S. PATENT DOCUMENTS

| | | | | |
|---|---|---|---|---|
| 5,825,762 A | * | 10/1998 | Kamin et al. .................. | 370/335 |
| 6,381,212 B1 | * | 4/2002 | Larkin .......................... | 370/210 |

(Continued)

FOREIGN PATENT DOCUMENTS

| | | |
|---|---|---|
| EP | 0702462 B1 | 10/2002 |
| EP | 2154793 A2 | 2/2010 |

(Continued)

OTHER PUBLICATIONS

Kaho, T. et al: "Adaptive Linearization Technique for a Multi-port Amplifier", Proc of Asia-Pacific Microwave Conference 2006, pp. 895-898, Dec. 1, 2006.

(Continued)

*Primary Examiner* — Mazda Sabouri

(57) ABSTRACT

A MIMO base station is provided that includes a multi-channel transmitter having an input Fourier Transform Matrix (FTM) and an output FTM that are each coupled to an intervening signal processing section having multiple radio frequency (RF) amplifiers. A signal applied to an input port of the input FTM is distributed to all RF amplifiers of the transmitter by the input FTM and then is recombined by the output FTM such that the signal is routed to a single antenna of the multiple antennas of an antenna array. Thus, for both MIMO and non-MIMO transmissions, all RF amplifiers are used to amplify each input signal, but the non-MIMO transmission signal then is recombined such that only a single transmit antenna then is used to transmit the signal. The base station further provides antenna selection for a single antenna transmission and gain allocation among the multiple antennas for a MIMO transmission.

10 Claims, 6 Drawing Sheets

(56) References Cited

U.S. PATENT DOCUMENTS

| | | |
|---|---|---|
| 6,738,019 B1 | 5/2004 | Luz et al. |
| 6,983,026 B2 | 1/2006 | Pinckley et al. |
| 7,069,051 B1 * | 6/2006 | Katz .......................... 455/562.1 |
| 2003/0179832 A1 | 9/2003 | Greenwood et al. |
| 2003/0214355 A1 | 11/2003 | Luz et al. |
| 2005/0272382 A1 | 12/2005 | Amano |
| 2007/0147536 A1 * | 6/2007 | Melzer et al. ................. 375/267 |
| 2007/0184849 A1 | 8/2007 | Zheng |
| 2008/0080634 A1 | 4/2008 | Kotecha et al. |
| 2010/0098184 A1 * | 4/2010 | Ryoo et al. .................... 375/267 |
| 2010/0118784 A1 * | 5/2010 | Goransson et al. ........... 370/328 |
| 2011/0176442 A1 * | 7/2011 | Ihm et al. ...................... 370/252 |

FOREIGN PATENT DOCUMENTS

| | | |
|---|---|---|
| WO | 2007089875 A2 | 8/2007 |
| WO | 2008004922 A1 | 1/2008 |
| WO | 2008066468 A2 | 6/2008 |
| WO | 2009022871 A2 | 2/2009 |

OTHER PUBLICATIONS

Cullen, Dr. John: "Patents Act 1977, Combined Search and Examination Report under Section 17 & 18(3)",date: Mar. 30, 2010, all pages.

* cited by examiner

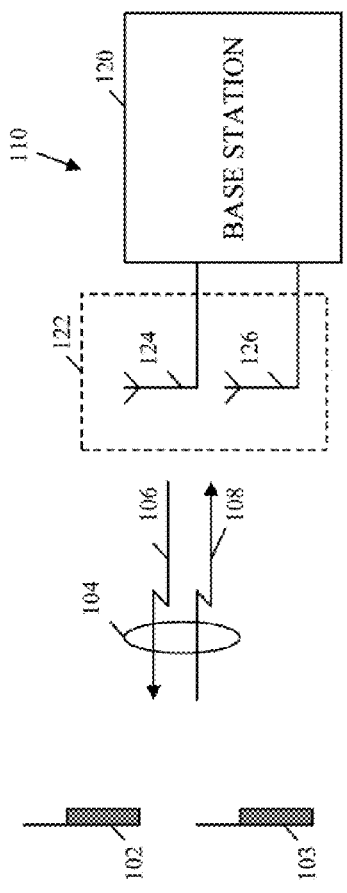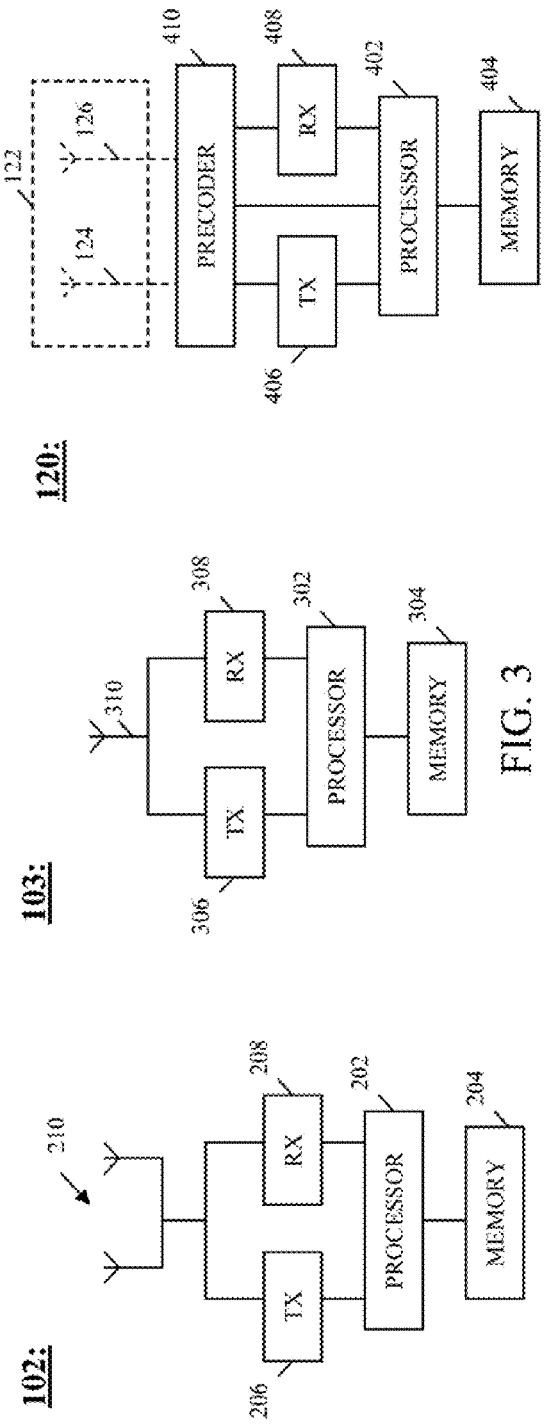

METHOD AND APPARATUS FOR ANTENNA SELECTION AND POWER CONTROL IN A MULTIPLE INPUT MULTIPLE OUTPUT WIRELESS COMMUNICATION SYSTEM

CROSS-REFERENCE TO RELATED APPLICATION

This application claims priority from provisional application Ser. No. 61/141,736, entitled "METHOD AND APPARATUS FOR ANTENNA SELECTION AND POWER CONTROL IN A MULTIPLE-INPUT MULTIPLE-OUTPUT WIRELESS COMMUNICATION SYSTEM," filed Dec. 31, 2008, which is commonly owned and incorporated herein by reference in its entirety.

FIELD OF THE INVENTION

The present invention relates generally to wireless communication systems, and in particular to a Multiple-Input Multiple-Output (MIMO) wireless communication system.

BACKGROUND OF THE INVENTION

Multiple-Input Multiple-Output (MIMO) transmissions have been proposed for fourth generation (4G) wireless communication systems. Unlike third generation (3G) wireless communication systems, where a single amplifier may amplify a signal that then is distributed to multiple elements of an antenna array, a MIMO transmitter conveys a different signal via each antenna of multiple antennas of an antenna array and correspondingly requires multiple amplifiers, that is, an amplifier for each antenna. However, as 4G wireless communication systems get rolled out, the 4G base station transmitters will have to service legacy communication technologies as well as a fourth generation communication technology. As a result, operation of a 4G base station will involve single antenna transmissions as well as multiple antenna transmissions. Single antenna transmissions merely require use of a single amplifier, with the result that the additional amplifiers included in the base station that supports MIMO transmissions will go unused in non-MIMO transmissions.

As MIMO wireless communication systems are rolled out, most transmissions will be legacy transmissions. Amplifiers are costly components of a base station and a failure to use, in a non-MIMO transmission, the multiple amplifiers that are available for MIMO transmissions is a waste of expense and hardware. Also, by amplifying a non-MIMO signal using a single amplifier, larger and more costly amplifiers are required than would be required if such a single was amplified using multiple amplifiers.

Therefore a need exists for a method and apparatus that utilizes all amplifiers of a MIMO transmitter regardless of whether or not a transmission is a MIMO transmission and that further allocates power gains among the multiple antennas of the MIMO transmitter.

BRIEF DESCRIPTION OF THE DRAWINGS

FIG. 1 is a block diagram of a wireless communication system in accordance with an embodiment of the present invention.

FIG. 2 is a block diagram of a user equipment of FIG. 1 that supports Multiple-Input Multiple-Output (MIMO) communications in accordance with an embodiment of the present invention.

FIG. 3 is a block diagram of a user equipment of FIG. 1 that does not support Multiple-Input Multiple-Output (MIMO) communications in accordance with an embodiment of the present invention.

FIG. 4 is a block diagram of a base station of FIG. 1 in accordance with an embodiment of the present invention.

Figure 5:
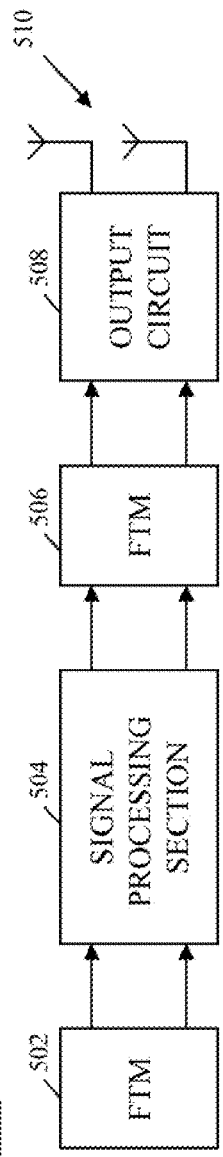
FIG. 5 is a block diagram of a transmitter of a base station of FIG. 1 in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DESCRIPTION OF A PREFERRED EMBODIMENT

To address the need for a method and apparatus that utilizes all amplifiers of a Multiple-Input Multiple-Output (MIMO) transmitter regardless of whether or not a transmission is a MIMO transmission and that further allocates power gains among the multiple antennas of the MIMO transmitter, a MIMO base station is provided that includes a multi-channel transmitter having an input Fourier Transform Matrix (FTM) and an output FTM that are each coupled to an intervening signal processing section having multiple radio frequency (RF) amplifiers. A signal applied to an input port of the input FTM is distributed to all RF amplifiers of the transmitter by the input FTM and then is recombined by the output FTM such that the signal is routed, at the output of the transmitter, to a single antenna of the multiple antennas of an antenna array coupled to the transmitter. Thus, for both MIMO and non-MIMO transmissions, all RF amplifiers are used to amplify each input signal, but the non-MIMO transmission signal then is recombined such that only a single transmit antenna then is used to transmit the signal. The base station further provides for antenna selection for a single antenna transmission and for gain allocation among the multiple antennas for a MIMO transmission.

Generally, the present invention encompasses a method for setting a transmit gain for one or more antennas of an antenna array comprising multiple antennas. The method includes determining whether a transmission to a user equipment (UE) will be a MIMO transmission and, if the transmission to the UE will not be a MIMO transmission, determining one or more of a path gain, signal attenuation, or path loss associated with each antenna of the antenna array, setting a power gain of an antenna with one or more of the largest path gain, smallest signal attenuation, and smallest path loss, to a non-zero value, and setting a power gain of the other antennas of the antenna array to zero. The method further includes, if the transmission to the UE will be a MIMO transmission, determining whether the transmission will be a 'rank=1' transmission or a 'rank=2' transmission and setting a power gain of each antenna of the plurality of antennas of the antenna array to a value that is based on whether the transmission will be a 'rank=1' transmission or a 'rank=2' transmission.

Another embodiment of the present invention encompasses a method for antenna selection by a MIMO base station associated with an antenna array having multiple antennas. The method includes determining whether a transmission to a UE will be a MIMO transmission, if the transmission to the UE will be a MIMO transmission, transmitting to the UE via each antenna of the multiple antennas, and if the transmission to the UE will be a non-MIMO transmission, selecting an antenna of the multiple antennas for the transmission based on a number of users associated with each antenna of the of the multiple antennas.

Yet another embodiment of the present invention encompasses a base station that supports MIMO transmissions and that comprises a multi-channel transmitter having an input FTM, a signal processing section, and an output FTM, and an antenna array having multiple antennas. The input FTM has a multiple input ports and multiple output ports, receives an input signal at one or more input ports of the multiple input ports and, for each input signal received at an input port, routes at least a portion of the input signal to each output port of the multiple output ports to produce multiple input FTM output signals. The signal processing section has multiple amplifiers, wherein each amplifier of the multiple amplifiers receives an input FTM output signal of the multiple input FTM output signals, amplifies the received input FTM output signal to produce an amplified signal, and routes the amplified signal to an input port of the output FTM. The output FTM has multiple input ports and multiple output ports, wherein each input port of the multiple input ports of the output FTM receives a signal that has been amplified by an amplifier of the signal processing section and produces an output signal at an output port of the multiple output ports based on the multiple received amplified signals, wherein each output signal at an output port of the multiple output ports of the output FTM is an amplified version of an input signal received at an input port of the multiple input ports of the input FTM. Each antenna of the multiple antennas of the antenna array is operably coupled to an output port of the multiple output ports of the output FTM and receives the output signal produced at the output port for transmission to a UE.

The present invention may be more fully described with reference to FIGS. 1-9. FIG. 1 is a block diagram of a wireless communication system 100 in accordance with an embodiment of the present invention. Communication system 100 includes multiple users' equipment (UEs) 102, 103 (two shown) such as but not limited to a cellular telephone, a radio telephone, a personal digital assistant (PDA) with radio frequency (RF) capabilities, or a wireless modem that provides RF access to digital terminal equipment (DTE) such as a laptop computer. In various technologies, the UEs may be referred to as mobile stations (MSs), subscriber units (SUs), subscriber stations (SSs), access terminals (ATs), and the like. Communication system 100 further includes a Radio Access Network (RAN) 110 that provides communication services to UEs 102 and 103 via an air interface 104 and that includes a base station (BS) 120, such as a Node B, Access Point (AP), or Base Transceiver Station (BTS), that supports Multiple-Input Multiple-Output (MIMO) communications. Air interface 104 comprises a downlink (DL) 106 and an uplink (UL) 108. Each of downlink 106 and uplink 108 comprises multiple physical communication channels, including multiple control channels and multiple traffic channels.

BS 120 is coupled to an antenna array 122 via a duplexer. Antenna array 122 comprises multiple antennas 124, 126 (two shown). By utilizing an antenna array to transmit signals to a UE located in a coverage area of the RAN, such as a cell or sector serviced by the antenna array, RAN 110, and in particular BS 120, is able to utilize MIMO techniques for the transmission of the signals.

Referring now to FIGS. 2, 3 and 4, block diagrams are respectively provided of UE 102 and 103 and BS 120 in accordance with various embodiments of the present invention. Each of UEs 102 and 103 and BS 120 includes a respective processor 202, 302, 402, such as one or more microprocessors, microcontrollers, digital signal processors (DSPs), combinations thereof or such other devices known to those having ordinary skill in the art. The particular operations/functions of processors 202, 302, and 402, and respectively thus of UEs 102 and 103 and of BS 120, are determined by an execution of software instructions and routines that are stored in a respective at least one memory device 204, 304, 404 associated with the processor, such as random access memory (RAM), dynamic random access memory (DRAM), and/or read only memory (ROM) or equivalents thereof, that store data and programs that may be executed by the corresponding processor.

Each of UEs 102 and 103 and BS 120 further includes a respective transmitter 206, 306, 406 and a respective receiver 208, 308, 408, which transmitter and receiver are each coupled to the processor 202, 302, 402 of the UE or BS. UE 102 supports MIMO communications and includes an antenna array comprising multiple antennas 210, unlike UE 103 which does not support MIMO and includes only a single antenna 310. BS 120 further includes a precoder 410 that is coupled to processor 402 and that is interposed between antenna array 122 and each of transmitter 406 and receiver 408. Precoder 410 weights signals applied to the multiple antennas 124, 126 of BS 120 based on data fed back by UE 102, for example, a codebook index and a rank index, in order to predistort and beamform the signals for transmission over downlink 106.

Each of UE 102 and BS 120 further maintains, in at least one memory devices 204 and 404 and/or in precoder 410, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail, except to note that the precoding matrix maintained by each of UE 102 and BS 120 is the same. Based on the channel conditions measured by UE 102 with respect to a Resource Block Group (RBG), the UE reports back a precoding metric, preferably a Precoding Matrix Indicator (PMI), for the RBG. In determining a precoding metric for an RBG, the UE computes a set of complex weights based on the measured channel conditions. The set of complex weights can be Eigen Beamforming vectors derived from downlink reference signal measurements. The complex weights are mapped to a set of already defined vectors, that it, to a nearest vector of the set of already defined vectors, to produce a precoding vector. The UE then conveys the index of the precoding vector selected by the UE using an uplink control channel.

The embodiments of the present invention preferably are implemented within UEs 102 and 103 and BS 120, and more particularly with or in software programs and instructions stored in the respective at least one memory devices 204, 304, 404 and executed by respective processors 202, 302, 402. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 102 and 103 and BS 120. Based on the present disclosure, one skilled in the art will be readily capable of producing and implementing such software and/or hardware without undo experimentation.

Communication system 100 comprises a legacy wireless communication system, such as a Code Division Multiple Access (CDMA) or a Global System for Mobile communications (GSM) or a later generation of such communication systems, such as a CDMA 2000 or a Universal Mobile Telecommunications System (UMTS) communication system, and further comprises a Multiple-Input Multiple-Output (MIMO) communication system that employs an Orthogonal Frequency Division Multiple Access (OFDMA) modulation scheme for transmitting data over air interface 104, wherein a frequency channel, or bandwidth, is split into multiple frequency sub-bands, wherein each sub-band comprises multiple orthogonal frequency sub-carriers over a given number of OFDM symbols, that are the physical layer channels over which traffic and signaling channels are transmitted in a TDM or TDM/FDM fashion.

Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an MIMO and an Orthogonal Frequency Division Multiplexing (OFDM) modulation scheme, such as a 3GPP2 (Third Generation Partnership Project 2) Evolution or Phase 2 communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultra wideband (UWB) communication systems.

FIG. 5 is a block diagram of transmitter 406 of BS 120 in accordance with an embodiment of the present invention. Transmitter 406 is a multi-channel transmitter that includes a hybrid matrix amplifier having a parallel set of amplifiers whose inputs are fed, and output are combined, by multi-port matrices, that is, Fourier Transform Matrices (FTMs). In general, a signal applied to an input port of an input FTM is distributed equally among multiple output ports of the input FTM. Each signal output by the input FTM is then routed to a separate amplifier, where the signal is amplified and then routed to one of multiple input ports of an output FTM. Each signal received at an input port of the output FTM is then distributed among multiple output ports of the output FTM. Each signal produced at one of the multiple output ports of an output FTM then is routed to an antenna in an antenna array coupled to the transmitter.

Figure 6:
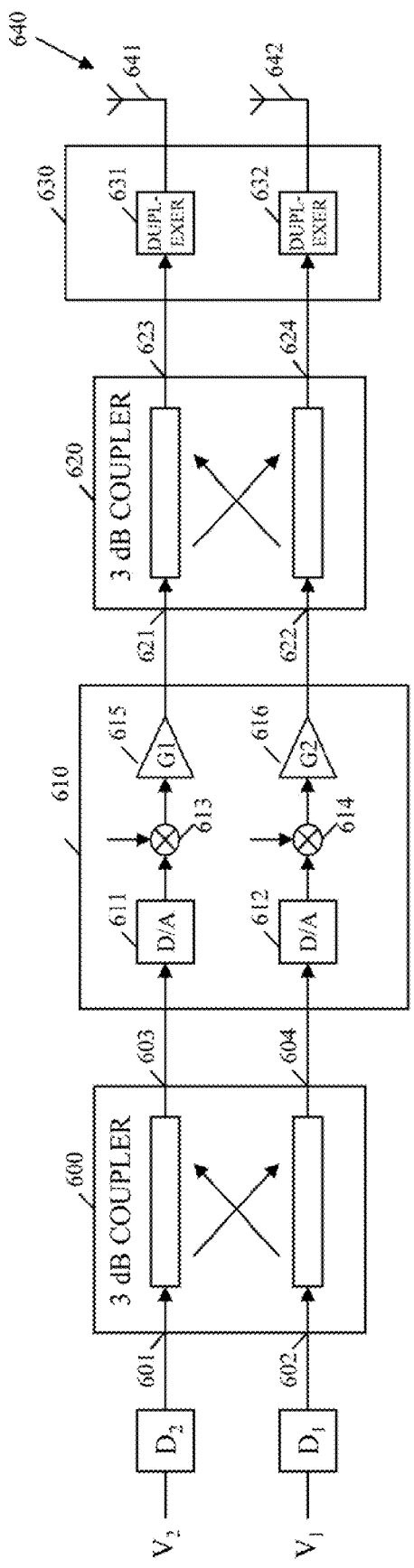
FIG. 6 is a block diagram of a transmitter of a base station of FIG. 1 in accordance with an embodiment of the present invention.

More particularly, transmitter 406 includes an input, digital baseband Fourier Transform Matrix (FTM) 502, a signal processing section 504 coupled to input FTM 502, an output, RF FTM 506 coupled to signal processing section 504, and an output circuit 508 coupled to RF FTM matrix 506. Output circuit 508 is coupled to an antenna array 510 that includes multiple antennas (two shown). In one embodiment of the present invention, each of input FTM 502 and output FTM 506 may be a 2×2 FTM. For example, and referring now to FIG. 6, a block diagram of a transmitter 650, such as transmitter 406, is depicted in accordance with a '2×2 FTM' embodiment of the present invention. As depicted in FIG. 6, transmitter 650 includes an input, digital baseband Fourier Transform Matrix (FTM) 600, a signal processing section 610 coupled to input FTM 600, an output, RF FTM 620 coupled to signal processing section 610, and an output circuit 630 coupled to output FTM matrix 620 and to an antenna array 640.

As FIG. 6 depicts two transmit paths for transmitter 650, antenna array 640 includes two antennas 641, 642, that is, an antenna for each transmit path. Each antenna of the two antennas 641, 642 is operably coupled to a transmit path of transmitter 600. Transmitter 600 processes multiple input signals, such as user data signals, $V_1, V_2$, received from an information source, such as processor 402, for transmission via antennas 641, 642 as follows. Preferably, each of input signals $V_1, V_2$ is a digital baseband input signal, preferably a quadrature modulation information signal, which baseband input signal includes an in-phase (I) component and a quadrature (Q) component.

Each transmit input signal $V_1, V_2$, corresponds to a respective antenna 641, 642 and is gain adjusted, at a gain adjuster, by a corresponding power gain factor $D_1, D_2$ for transmission via the corresponding antenna. That is, input signal $V_1$, gain adjusted by a gain factor $D_1$, is intended for antenna 641 and input signal $V_2$, gain adjusted by a power gain factor $D_1$, is intended for antenna 642. Although the gain adjusters are depicted as preceding input FTM 600 in FIG. 6 (and preceding an input FTM 700 in FIG. 7), the gain adjusters instead may reside in the output circuitry 630, 750 of transmitters 650 and 770.

Transmitter 650 routes each of input signals $V_1, V_2$, correspondingly gain adjusted by gain factors $D_1$ and $D_2$, to a first, baseband FTM 600 of the two FTMs 600, 620. Each of FTM 600 and 620 comprises a 90° hybrid- or 3 dB coupler having two input ports, that is, input ports 601 and 602 with respect to FTM 600 and input ports 621 and 622 with respect to FTM 620, and two output ports, that is, output ports 603 and 604 with respect to FTM 600 and input ports 623 and 624 with respect to FTM 620. A second input signal $V_2$ of the two input signals $V_1, V_2$ is routed to a first input port 601 of FTM 600 and a first input signal $V_1$ of the two input signals $V_1, V_2$ is routed to a second input port 602 of FTM 600. FTM 600 then routes a portion of input signal $V_1$ to each of output ports 603 and 604, and routes a portion of input signal $V_2$ to each of output ports 603 and 604.

2×2 FTMs are well known in the art. In brief, the operation of FTMs 600 and 620 may be described as follows. When a first signal is received at a first input port of two input ports of an FTM, the power or energy of the signal is split into two equal quantities, with one quantity fed to a first output port and the other quantity fed to a second output port of the FTM, with a 900 phase rotation introduced to the signal coupled to the second output port. As a result, a phase of the signal then transmitted from second output port is offset by 90° from a phase of a signal then transmitted from first output port. Similarly, when a second signal is received at a second input port of the two input ports, the power or energy of the signal is split into two equal quantities, with one quantity fed to the second output port and the other quantity fed to the first output port of the FTM, with a 90° phase rotation introduced to the signal coupled to the first output port. As a result, a phase of the signal then transmitted from first output port is offset by 90° from a phase of a signal then transmitted from second output port.

Signal processing section 610 comprises two transmit paths. A first transmit path of the two transmit paths is coupled to a first output port 603 of FTM 600 and to a first input port 621 of FTM 620 and comprises a first digital-to-analog converter (D/A) 611 coupled to a first RF modulator 613, which RF modulator is coupled to a first RF amplifier 615. A second transmit path of the two transmit paths is coupled to a second output port 604 of FTM 600 and to a second input port 622 of FTM 620 and comprises a second digital-to-analog converter (D/A) 612 coupled to a second RF modulator 614, which RF modulator is coupled to a second RF amplifier 616.

Each D/A 611, 612 converts a signal received from a respective output port 603, 604 of FTM 600 to an analog signal and routes the analog signal to a respective RF modulator 613, 614. Each RF modulator 613, 614 modulates an RF carrier, $e^{j\omega t}$, with the analog signal received from a respective D/A 611, 612 to produce an RF modulated signal and routes the modulated signal to a respective RF power amplifier 615, 616. Each RF power amplifier 615, 616 amplifies the RF modulated signal received from a respective RF modulator 613, 614 to produce a respective amplified signal that is then output by the RF power amplifier and by signal processing section 610. Each of the amplified signals is then routed, by section 610, to a respective input port 621, 622 of RF FTM 620.

A first output port 623 of the two output ports of FTM 620 is coupled to a first antenna 641 of antenna array 640 via a first duplexer 631 of output circuit 630, and a second output port 624 of the two output ports of FTM 620 is coupled to a second antenna 642 of antenna array 640 via a second duplexer 632 of output circuit 630. FTM 620 operates on the upconverted and amplified signals received from signal processing section 610 such that an upconverted and amplified version of input signal $V_1$ will appear at antenna 641 but not antenna 642, and an upconverted and amplified version of input signal $V_2$ will appear at antenna 642 but not antenna 641.

That is, a transfer function A for each FTM 600, 620 may be represented by the following equation:

$$A = \begin{bmatrix} \frac{1}{\sqrt{2}} & \frac{j}{\sqrt{2}} \\ \frac{j}{\sqrt{2}} & \frac{1}{\sqrt{2}} \end{bmatrix} = \frac{1}{\sqrt{2}} \begin{bmatrix} 1 & J \\ J & 1 \end{bmatrix}$$

The transfer function for the combined operation of the two FTMs 600, 620 then is $$A^2 = \begin{bmatrix} A11 & A12 \\ A21 & A22 \end{bmatrix}^2 = 0.5 \begin{bmatrix} 1 & J \\ J & 1 \end{bmatrix} \begin{bmatrix} 1 & J \\ J & 1 \end{bmatrix} = 0.5 \begin{bmatrix} 1+J^2 & J+J \\ J+J & J^2+1 \end{bmatrix}$$

$$0.5 \begin{bmatrix} 0 & 2J \\ 2J & 0 \end{bmatrix}$$

$$J \begin{bmatrix} 0 & 1 \\ 1 & 0 \end{bmatrix}$$

This indicates that the signal $V_2$ that is received at the first input port 601 of FTM 600 will be amplified by each of RF amplifiers 615 and 616 but will appear at antenna 642 and not at antenna 641, and the signal $V_1$ that is received at the second input port 602 of FTM 600 also will be amplified by each of RF amplifiers 615 and 616 but will appear at antenna 641 and not at antenna 642.

Figure 7:
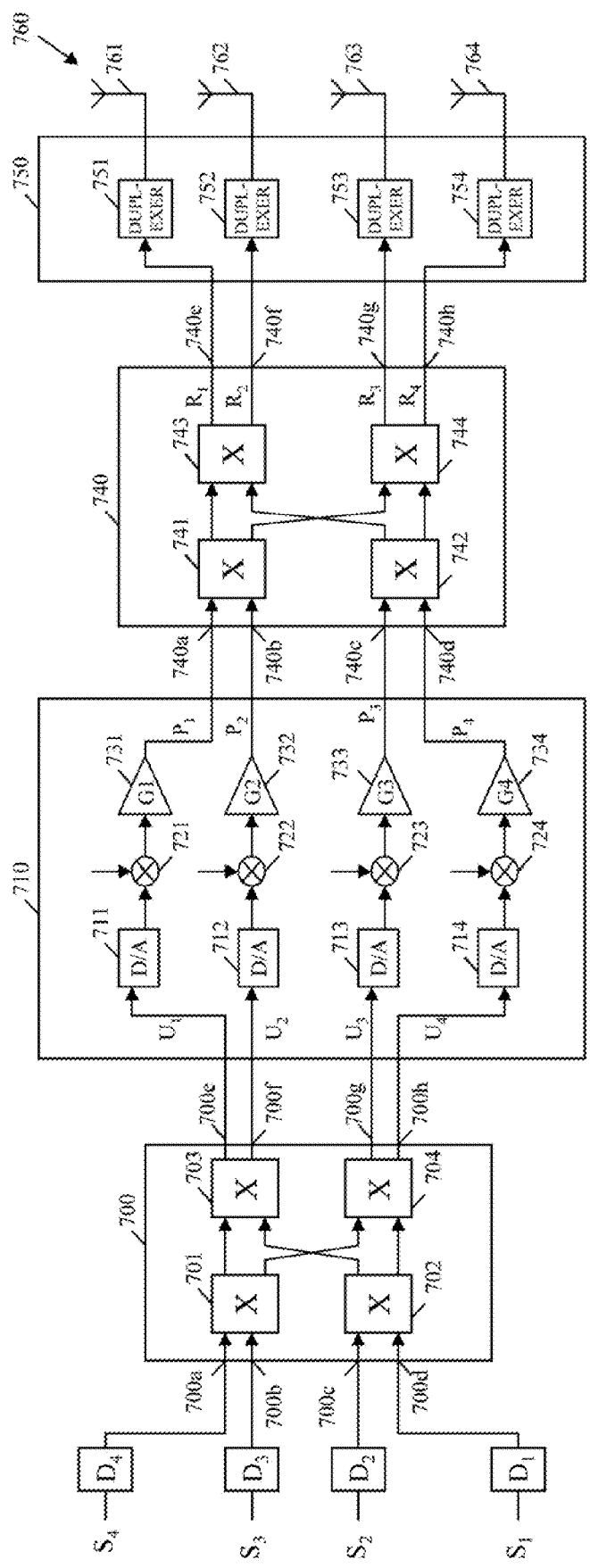
FIG. 7 is a block diagram of a transmitter of a base station of FIG. 1 in accordance with another embodiment of the present invention.

In another embodiment of the present invention, each of FTMs 502 and 506 of transmitter 406 may be a 4×4 FTM. For example, and referring now to FIG. 7, a block diagram of a transmitter 770, such as transmitter 406, is depicted in accordance with a '4×4 FTM' embodiment of the present invention. As depicted in FIG. 7, transmitter 770 includes a input, digital baseband Fourier Transform Matrix (FTM) 700, a signal processing section 710 coupled to input FTM 700, an output, RF FTM 740 coupled to signal processing section 710, and an output circuit 750 coupled to output FTM matrix 740 and to an antenna array 760.

Each FTM 700, 740 is a 4×4 FTM that includes four 2×2 FTM elements, that is, a first input 2×2 FTM element 701, a second input 2×2 FTM element 702, a first output 2×2 FTM element 703, and a second output 2×2 FTM element 704 with respect to FTM 700 and a first input 2×2 FTM element 741, a second input 2×2 FTM element 742, a first output 2×2 FTM element 743, and a second output 2×2 FTM element 744 with respect to FTM 740. Each FTM element 701-704 and 741-744 is a 2×2 FTM that comprises a 90° hybrid- or 3 dB coupler and that operates as described above with respect to 2×2 FTMs 600 and 620. A 4×4 FTM, such as FTM's 700 and 740, distributes signals received at each of multiple input ports of the FTM among multiple output ports of the FTM, so that each FTM output signal is a derivation of all of the FTM input signals and has a specific phase relationship to each of the other FTM output signals.

Transmitter 770 is shown comprising four transmit paths, and accordingly antenna array 760 includes four antennas 761-764, that is, an antenna for each transmit path. Each antenna of the multiple antennas antennas 761-764 is operably coupled to a transmit path of transmitter 770. Transmitter 770 processes multiple input signals $S_1$, $S_2$, $S_3$, and $S_4$, received from an information source, such as processor 402, for transmission via antennas 761-764 as follows. Each transmit input signal, for example, user data signals, $S_1, S_2, S_3$, and $S_4$ corresponds to a respective antenna 761-764 and is gain adjusted by a corresponding power gain factor $D_1, D_2, D_3, D_4$ for transmission via the corresponding antenna. That is, input signal $S_1$, gain adjusted by power gain factor $D_1$, is intended for antenna 761, input signal $S_2$, gain adjusted by power gain factor $D_2$, is intended for antenna 762, input signal $S_3$, gain adjusted by power gain factor $D_3$, is intended for antenna 763, and input signal $S_4$, gain adjusted by power gain factor $D_4$, is intended for antenna 764. Preferably, each of input signals $S_1$, $S_2, S_3$, and $S_4$ is a digital baseband input signal, preferably a quadrature modulation information signal, which baseband input signal includes an in-phase (I) component and a quadrature (Q) component.

Transmitter 770 routes each of input signals $S_1$, $S_2$, $S_3$, and $S_4$ to a respective input port 700a, 700b, 700c, and 700d of digital, baseband 4×4 FTM 700. Based on the received input signals, FTM 700 produces, as described in greater detail below, output signals $U_1$, $U_2$, $U_3$, and $U_4$ at respective output ports 700e-700h of the FTM. Each output signal $U_1$, $U_2$, $U_3$, and $U_4$ is then routed to signal processing section 710. Signal processing section 710 includes multiple, preferably four, forward paths, wherein the number of forward paths corresponds to the number of output signals $U_1$, $U_2$, $U_3$, and $U_4$ received by section 710 from FTM 700 and to the number of antennas 761-764 coupled to transmit branch 300. Each forward path of the four forward paths of signal processing section 710 provides for RF modulation and amplification of a signal received from FTM 700. Each forward path of signal processing section 710 includes a D/A of multiple D/As 711-714 coupled to a respective output port 700e-700h of FTM 700, one of multiple RF modulators 721-724 coupled to the D/A, and one of multiple RF power amplifiers 731-734 coupled to the RF modulators.

In a first forward path of the four forward paths of signal processing section 710, signal $U_1$ is routed to a first D/A 711. In a second forward path of the four forward paths of section 710, output signal $U_2$ is routed to a second D/A 712. In a third forward path of the four forward paths of section 710, output signal $U_3$ is routed to a third D/A 713. In a fourth forward path of the four forward paths of section 710, output signal $U_4$ is routed to a fourth D/A 714. Each D/A 711-714 converts the received signal to an analog signal and routes the analog signal to a respective RF modulator 721-724. Each RF modulator 721-724 modulates an RF carrier, $e^{j\omega t}$, with the analog signal received from a respective D/A 711-714 to produce an RF modulated signal and routes the modulated signal to a respective RF power amplifier 731-734. Each RF power amplifier 731-734 amplifies the RF modulated signal received from a respective RF modulator 721-724 to produce a respective amplified signal $P_1$, $P_2$, $P_3$, $P_4$, that is then output by the RF power amplifier and by signal processing section 710. Each of amplified signals $P_1$, $P_2$, $P_3$, $P_4$, is then routed, by section 710, to a respective input port 740a, 740b, 740c, and 740d of RF FTM 740.

Based on the amplified signals $P_1$, $P_2$, $P_3$, $P_4$ received from RF power amplifiers 731-734, RF FTM 740 produces output signals $R_1$, $R_2$, $R_3$, and $R_4$ at respective output ports 740e-740h of the FTM. FTM 740 then routes each output signal $R_1$, $R_2$, $R_3$, and $R_4$ to a respective antenna 761-764 via a respective duplexer 751-754 of output circuit 750.

By way of example, the operation of FTM 700, and similarly of FTM 740, may be described as follows. FTM 700 includes two input 2×2 FTM's 701, 702, and two output 2×2 FTM's 703, 704. As described above with respect to 2×2 FTMs 600 and 620, each 2×2 FTM 701-704 of 4×4 FTM 700 includes two input ports and two output ports. The input 2×2 FTM's 701 and 702 may together be represented by a transfer function $$\begin{bmatrix} y_1 \\ y_2 \\ y_3 \\ y_4 \end{bmatrix} = \begin{bmatrix} m_1 & m_2 & 0 & 0 \\ m_3 & m_4 & 0 & 0 \\ 0 & 0 & m_1 & m_2 \\ 0 & 0 & m_3 & m_4 \end{bmatrix} \begin{bmatrix} x_1 \\ x_2 \\ x_3 \\ x_4 \end{bmatrix}$$

wherein $x_1$ and $x_2$ are signals respectively input into each of a first input port and a second input port of input FTM element 701, $x_3$ and $x_4$ are signals respectively input into each of a first input port and a second input port of input FTM element 702, $y_1$ and $y_2$ are signals respectively output by each of a first output port and a second output port of input FTM element 701, and $y_3$ and $y_4$ are signals respectively output by each of a first output port and a second output port of input FTM element 702. Coefficients $m_i$, i=1, 2, 3, and 4 are complex numbers that represent the phase and amplitude relationship between the input and output signals of each FTM 701, 702. Ideally, each 2×2 FTM included in a 4×4 FTM is identical to the other 2×2 FTM's of the 4×4 FTM, and therefore the corresponding coefficients $m_i$, i=1, 2, 3, and 4, for each 2×2 FTM 701-704 included in 4×4 FTM 700 are the same.

The signals output by first input FTM 701, that is, $y_1$ and $y_2$, are respectively input into a first input port of first output FTM element 703 and a first input port of second output FTM element 704. The signals output by second input FTM 702, that is, $y_3$ and $y_4$, are respectively input into a second input port of first output FTM 703 and a second input port of second output FTM 704. First output FTM 703 outputs a signal $z_1$ from a first output port of FTM 703 and a signal $z_2$ from a second output port of FTM 703, and second output FTM 704 outputs a signal $z_3$ from a first output port of FTM 704 and a signal $z_4$ from a second output port of FTM 704. As a result, a transfer function of FTM 700 may be represented by the following equation, $$\begin{bmatrix} z_1 \\ z_2 \\ z_3 \\ z_4 \end{bmatrix} = \begin{bmatrix} m_1 & m_2 & 0 & 0 \\ m_3 & m_4 & 0 & 0 \\ 0 & 0 & m_1 & m_2 \\ 0 & 0 & m_3 & m_4 \end{bmatrix} \begin{bmatrix} m_1 & m_2 & 0 & 0 \\ 0 & 0 & m_1 & m_2 \\ m_3 & m_4 & 0 & 0 \\ 0 & 0 & m_3 & m_4 \end{bmatrix} \begin{bmatrix} x_1 \\ x_2 \\ x_3 \\ x_4 \end{bmatrix} =$$

$$\begin{bmatrix} m_1^2 & m_1 m_2 & m_1 m_2 & m_2^2 \\ m_1 m_3 & m_2 m_3 & m_1 m_4 & m_2 m_4 \\ m_1 m_3 & m_1 m_4 & m_2 m_3 & m_2 m_4 \\ m_3^2 & m_3 m_4 & m_3 m_4 & m_4^2 \end{bmatrix} \begin{bmatrix} x_1 \\ x_2 \\ x_3 \\ x_4 \end{bmatrix}$$

Furthermore, with respect to 4×4 FTM 700, when the inputs to the FTM are $S_4$, $S_3$, $S_2$, $S_1$, the outputs of the FTM are $U_1$, $U_2$, $U_3$, $U_4$, and the coefficients of FTM elements 701-704 are $m_1=m_4=1$ and $m_2=m_3=j$. A substitution of these values into above equation, ignoring a same scaling factor that is applied to each input signal due to the power division of the signal by the FTM, results in the following equation, $$U = \begin{bmatrix} U_1 \\ U_2 \\ U_3 \\ U_4 \end{bmatrix} = \begin{bmatrix} 1 & j & j & -1 \\ j & -1 & 1 & j \\ j & 1 & -1 & j \\ -1 & j & j & 1 \end{bmatrix} \begin{bmatrix} S_4 \\ S_3 \\ S_2 \\ S_1 \end{bmatrix}.$$

When only $S_1$ is input into FTM 700, the above equation becomes $$U = \begin{bmatrix} U_1 \\ U_2 \\ U_3 \\ U_4 \end{bmatrix} = \begin{bmatrix} 1 & j & j & -1 \\ j & -1 & 1 & j \\ j & 1 & -1 & j \\ -1 & j & j & 1 \end{bmatrix} \begin{bmatrix} 0 \\ 0 \\ 0 \\ S_1 \end{bmatrix} = \begin{bmatrix} -S_1 \\ jS_1 \\ jS_1 \\ S_1 \end{bmatrix}.$$

From this equation it is apparent that the amplitude of the four signals output at the output ports of output FTM elements 703 and 704, and therefore output by FTM 700, is a same scaled version of $|S_1|$. Thus, the power is evenly distributed among each of the four output ports of FTM 700 and for any one of the input signals, FTM 700 always distributes the incoming signal power evenly among all four of RF power amplifiers 731-734 of signal processing section 710. Furthermore, by using FTM 740, a desired amplified signal is seen at only one of the multiple transmit antennas 761-764. That is, by using both a first FTM 700 and a second FTM 740, a power sharing that is accorded to a signal applied to the first FTM 700 is redirected to a specific antenna 761-764 by the second FTM 740.

Thus, by using both a baseband FTM and an RF FTM, all amplifiers of signaling processing section 504 of transmitter 406 are used to amplify a user data signal that is then transmitted to a user regardless of whether the user is a MIMO user or a non-MIMO user. For a MIMO user or transmission, such as UE 102, all RF amplifiers are used to amplify each input signal of multiple input signals. Each input signal is distributed to all RF amplifiers of the transmitter by the baseband FTM and then is recombined by the RF FTM such that the signal is routed, at the output of the transmitter, to a single antenna of the multiple transmit antennas. For a non-MIMO user or transmission, such as UE 103, again all RF amplifiers are used to amplify the input signal, but the signal then is recombined such that only a single transmit antenna then is used to transmit the signal. By amplifying a non-MIMO signal using all of the multiple parallel amplifiers of the multi-channel transmitter, smaller, less costly amplifiers may be used in the transmitter than would be required if each transmit path of the transmitter had to have a amplifier large enough to singly amplify the non-MIMO signal. Further, the gain applied to a signal by the RF amplifiers may be evenly distributed among the amplifiers even when power is being unevenly allocated (that is, when the power gain factors $D_1$, $D_2$, $D_3$, $D_4$ are unequal) among the different antennas, resulting in even wear on the RF amplifiers and minimizing a likelihood of overdriving a particular amplifier of the multiple RF amplifiers.

Figure 8A:
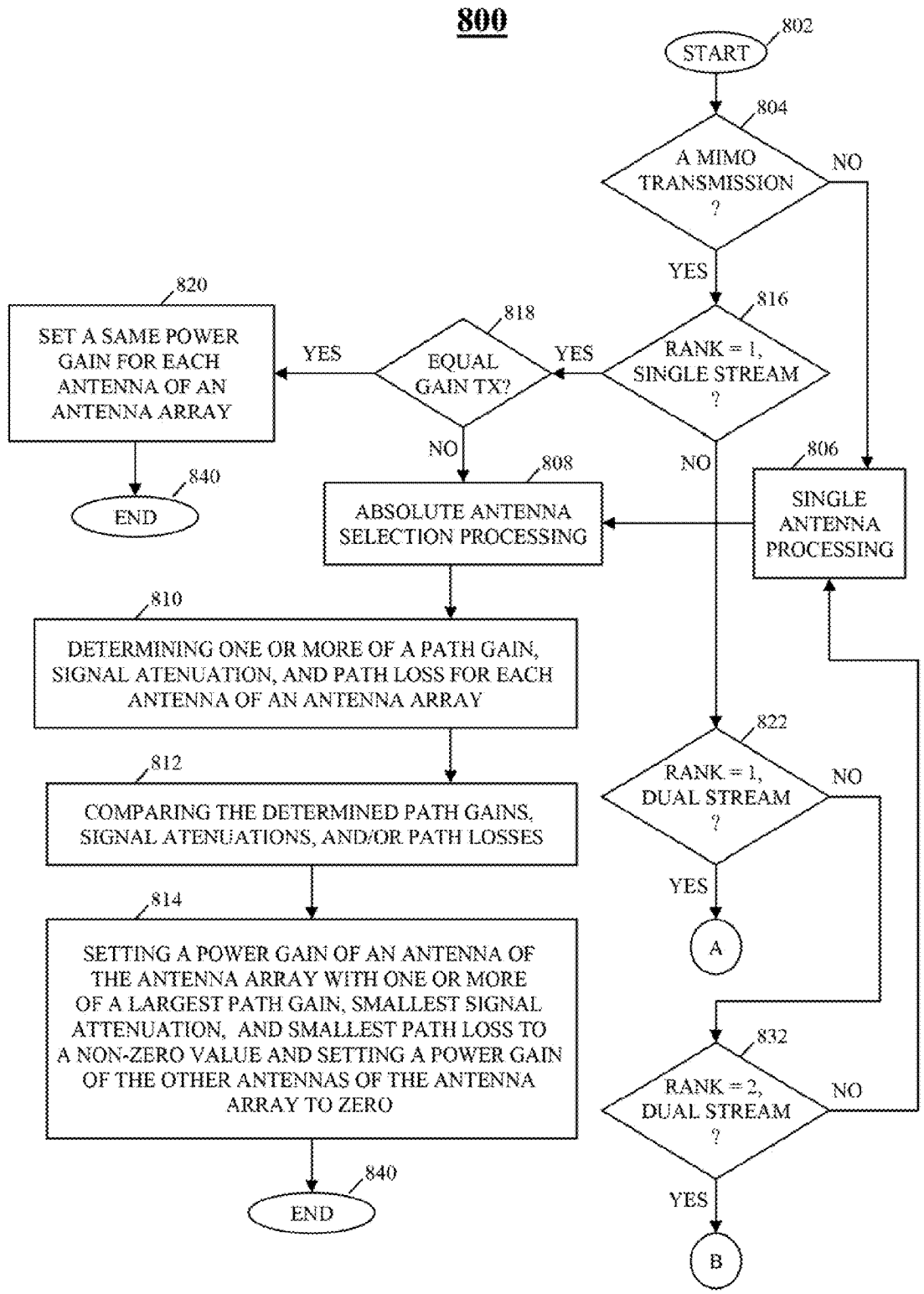
FIG. 8A is a logic flow diagram that illustrates a method executed by a base station of FIG. 1 for performing antenna selection and for setting a gain for each antenna of an antenna array associated with the base station for a downlink transmission in accordance with an embodiment of the present invention.
Figure 8B:
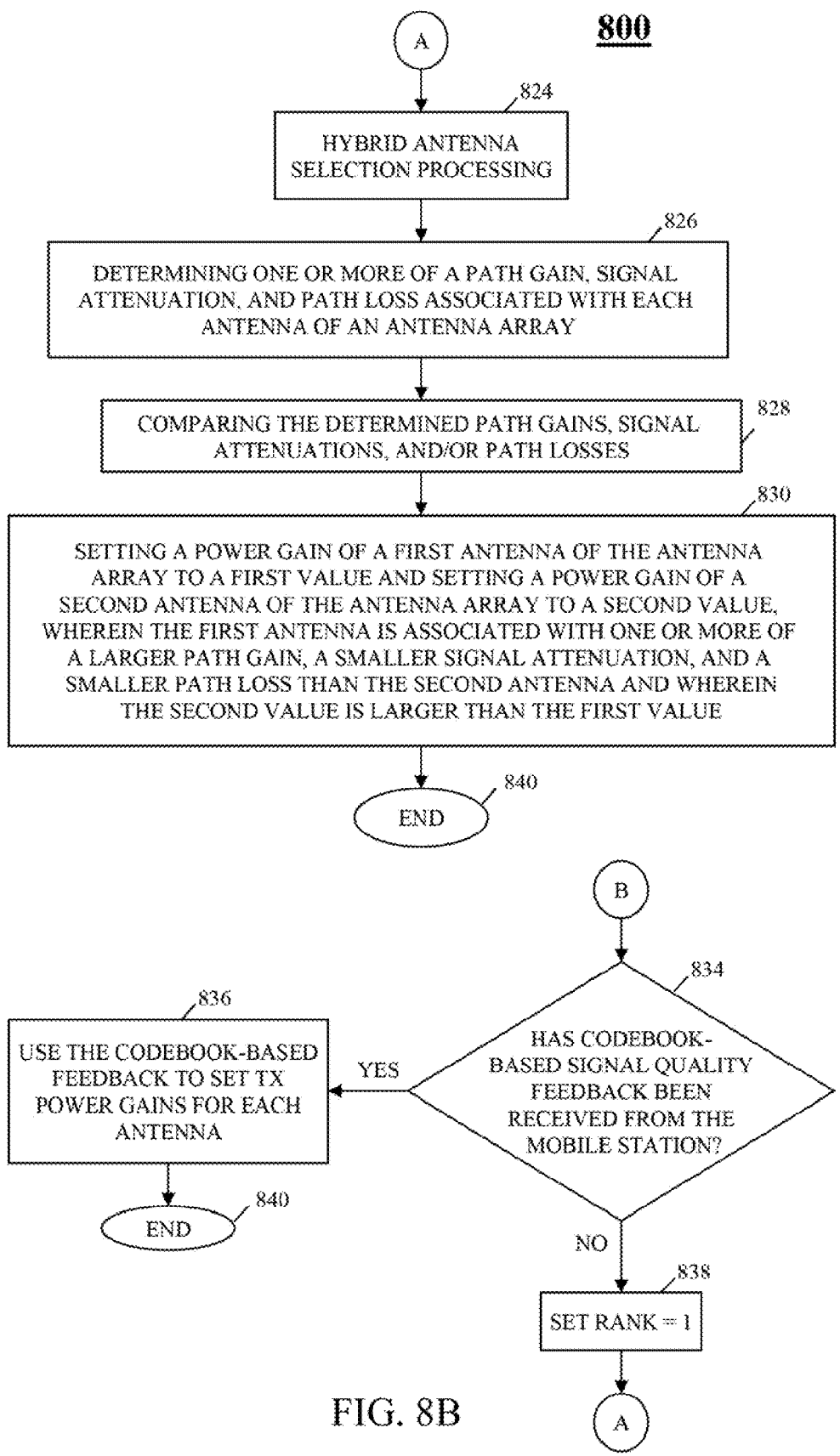
FIG. 8B is a continuation of the logic flow diagram of FIG. 8A that illustrates a method executed by a base station of FIG. 1 for performing antenna selection and for setting a gain for each antenna of an antenna array associated with the base station for a downlink transmission in accordance with an embodiment of the present invention.

Referring now to FIGS. 8A and 8B, a logic flow diagram 800 is depicted that illustrates a method executed by BS 120, and in particular by processor 402 of the BS, for performing antenna selection and for setting a gain (for example, $D_1$ and $D_2$) for each antenna of antenna array 122 for a downlink transmission in accordance with an embodiment of the present invention. Although logic flow diagram 800 is described with respect to two power gain factors ($D_1$, $D_2$) and two antennas (124 and 126), one of ordinary skill in the art realizes that the method depicted in logic flow diagram 800 may be applied to any number of antennas and corresponding power gain factors.

Logic flow diagram 800 begins (802) when BS 120 determines (804) whether a transmission will be a MIMO transmission, for example, determining whether an UE, such as UEs 102 and 103, associated with the transmission supports MIMO. For example, when a UE registers with communication system 100, and more particularly with BS 120, the UE may convey its capabilities to the BS, such as whether the UE supports MIMO. By way of another example, when BS 120 acquires a UE, such as when the UE activates under or is handed off to the BS, the BS may retrieve a profile of the UE, for example, from a database of UE profiles or from a network node that has retrieved and stored a profile of the UE, that indicates whether the UE supports MIMO.

If the transmission is not a MIMO transmission, for example, is a transmission to UE 103, then BS 120 determines (806) to perform single antenna signal processing and initiates (808) a single antenna selection process. That is, BS 120 determines that the BS will transmit to the UE via only a single antenna, and initiates a process of selecting an antenna and correspondingly setting gains for all antennas of antenna array 122. BS 120 then determines (810) one or more RF conditions associated with each antenna 124, 126 of antenna array 122, and more particularly one or more of a path gain, signal attenuation, and path loss associated with each antenna of the antenna array. BS 120 compares (812) the determined RF condition(s), that is, the path gains, signal attenuations, or path losses, to each other and determines which antenna of the multiple antennas 124, 126 of antenna array 122 is associated with the best RF conditions, that is, has a largest path gain, smallest signal attenuation, and/or smallest path loss. For example, with respect to the 2×2 FTM embodiment of transmitter 406, BS 120 determines whether the path gain associated with a first antenna of antenna array 122, for example, antenna 124, is greater than a path gain associated with a second antenna of antenna array 122, for example, antenna 126, and/or whether a signal attenuation or path loss associated with antenna 124 of the antenna array is less than the signal attenuation or path loss associated with antenna 126 of the antenna array.

In one embodiment of the present invention, the path gain, signal attenuation, or path loss, associated with each antenna 124, 126 may be determined based on an uplink signal, such as an uplink pilot signal, received at each antenna of BS 120 from the UE. In another embodiment of the present invention, BS 120 may transmit a different pilot to the UE via each antenna of antenna array 122. The UE then may feedback a signal quality, such as Channel Quality Information (CQI), associated with each received pilot, allowing the BS to determine which pilot, and correspondingly which antenna, provided the best link to the UE, that is, had the greatest path gain or least signal attenuation or path loss.

In yet another embodiment of the present invention, path gain, signal attenuation, or path loss, associated with each antenna 124, 126 may be determined based on codebook-based signal quality feedback provided by the UE, such as a codebook index value, a rank index, and/or a Pre-coding Matrix Indication (PMI) index value fed back by the UE in accordance with known codebook-based feedback techniques. That is, MIMO uses codebook-based beamforming weight selection that involves selection, by a BS based on feedback from a UE, of a set of pre-coding matrices, that is, predetermined beamforming weights that are agreed upon between a transmitter and receiver. The weights are selected from a set, or codebook, of predetermined and agreed upon (that is, known to both the BS and UE) matrices of beamforming weights. Each matrix in the codebook can be identified by an index, and the UE identifies the weights to be applied by feeding back an index to a matrix and rank of the matrix. In this way, only an index and a rank need be used in feedback to the BS in order for the transmitter to know the proper weights to use. In order to provide such feedback, the BS conveys a midamble, that is, a predetermined signal, to the UE via antenna array 122. Based on the received midamble, the UE computes a channel response for the air interface between the UE and the BS and, based on the channel response, determines a matrix and rank of weights for application to downlink transmissions. For a rank 'n' transmission, the BS then uses the first 'n' columns of selected matrices as the beamforming weights.

In response to determining which antenna of the multiple antennas 124, 126 of antenna array 122 has a largest path gain, smallest signal attenuation, and/or smallest path loss, BS 120 sets (814) a power gain of an antenna 124, 126 associated with the best RF conditions, that is, one or more of the largest path gain, smallest signal attenuation, and smallest path loss to a non-zero value and sets a power gain of the other antennas of the antenna array to zero.

For example, with respect to the 2×2 FTM embodiment of transmitter 406, when the path gain associated with the antenna 124 is greater than the path gain associated with the antenna 126, or a signal attenuation or path loss associated with antenna 124 is less than a signal attenuation or path loss associated with antenna 126, then BS 120 sets the power gain for the transmission via antenna 124, that is, D1, to a value, for example, '$Y_1$', that is determined based on the feedback from the UE (or based on the uplink signal received via each antenna of the BS) and sets the power gain for the transmission via antenna 126, that is, D2, to zero for a subsequent transmission of user data to the UE. When the path gain associated with antenna 126 is greater than the path gain associated with antenna 124, or a signal attenuation or path loss associated with the second antenna is less than a signal attenuation, or path loss, associated with the first antenna, then BS sets the power gain for the transmission via antenna 124, that is, D1, to zero and sets power gain for the transmission via antenna 126, that is, D2, to a value, for example, '$Y_2$', that is determined based on the feedback from the UE (or based on the uplink signal received via each antenna of the BS) for a subsequent transmission of user data to the UE. Logic flow 800 then ends (840).

If, at step 804, BS 120 determines that the transmission will be a MIMO transmission, for example, is a transmission to UE 102, then BS 120 determines (816, 822, 832) whether the transmission will be a 'rank=1', single stream transmission, a 'rank=1', dual stream transmission, or a 'rank=2', dual stream transmission. If BS 120 determines (816) that the transmission will be a 'rank=1', single stream MIMO transmission, the BS further determines (818) whether the power gain allocated to transmissions via each of the multiple antennas 124, 126 of antenna array 122 will be equal. If the power gain allocated to transmissions via each of the multiple antennas will be equal, then BS 120 sets (820) an approximately same, non-zero power gain for each antenna of the antenna array, that is, for antenna 124, that is, D1, and for antenna 126, that is, D2, for a subsequent transmission of user data to the UE. Logic flow 800 then ends (840). If the power gain to be allocated to transmissions via each of the multiple antennas will not be equal, then BS 120 proceeds to step 808 and selects an optimal antenna 124, 126 to use for a subsequent transmission of user data to the UE, and logic flow 800 then ends (840).

If BS 120 determines (822) that the transmission will be a 'rank=1', dual stream MIMO transmission, then BS 120 initiates (824) a hybrid antenna selection process. That is, BS 120 determines that the BS will transmit to the UE via both antennas and initiates a process of setting a positive, non-zero gain for each antenna 124, 126 of antenna array 122. BS 102 then determines (826) one or more RF conditions associated with each antenna 124, 126 of antenna array 122, that is, one or more a path gain, signal attenuation, and/or path loss associated with each antenna of the antenna array, and compares (828) the determined one or more RF condition(s), the is, the path gains, signal attenuations, or path losses, to each other. For example, with respect to the 2×2 FTM embodiment of transmitter 406, BS 120 determines whether the path gain associated with antenna 124 of antenna array 122 is greater than the path gain associated with antenna 126 of antenna array 122 and/or whether a signal attenuation or path loss associated with antenna 124 is less than a signal attenuation or path loss associated with antenna 126.

BS 120 then sets (830) a power gain of a first antenna of antenna array 122 to a first value and sets a power gain of a second antenna of antenna array 122 to a second value, wherein the first antenna of antenna array 122 is associated with better RF conditions, that is, one or more of a larger path gain, a smaller signal attenuation, or a smaller path loss, than the second antenna of antenna array 122 and wherein the second value is larger than the first value. Logic flow 800 then ends (840). For example, when a path gain associated with antenna 124 is greater than a path gain associated with antenna 126, or a signal attenuation or path loss associated with antenna 124 is less than a signal attenuation or path loss associated with antenna 126, then BS 120 sets the power gain factor, that is, D2, for a subsequent transmission of user data via antenna 126 to a value that is greater, for example, '$Y_3$' times greater, than a power gain factor, that is, D1, value that is set by the BS for a transmission via antenna 124. On the other hand, when the path gain for a transmission via antenna 126 is greater than the path gain for a transmission via antenna 124, or a signal attenuation or path loss of a transmission via antenna 126 is less than a signal attenuation, or path loss, of a transmission via antenna 124, then BS 120 sets the power gain factor, that is, D1, for a subsequent transmission of user data via antenna 124 to a value that is greater, for example, '$Y_4$' times greater, than a power gain factor, that is, D2, value that is set by the BS for a transmission via antenna 126. Preferably, the power gain values are determined based on the feedback from the UE (or based on the uplink signal received via each antenna of the BS) and are set such that the UE may receive transmissions from each antenna at approximately equal received signal strengths.

If BS 120 determines (832) that the transmission will be a 'rank=2', dual stream MIMO transmission, then BS 120 determines (834) whether the BS has received codebook-based signal quality feedback from the UE, such as a codebook index value, a rank index, and/or a Pre-coding Matrix Indication (PMI) index value. If BS 120 has received codebook-based signal quality feedback from the UE, then the BS uses the codebook-based feedback to set (836) a power gain value for each antenna 124, 126 of antenna array 120. That is, BS 120 uses the codebook-based feedback to select a matrix and rank from a set of matrices, that is, a codebook, to determine complex weights for application to each antenna 124, 126 for a subsequent transmission of user data to the UE. Logic flow 800 then ends (840). If BS 120 has not received codebook-based signal quality feedback from the UE, then BS 120 sets (838) the rank=1 and proceeds to step 824 and performs the hybrid antenna selection process described above. Logic flow 800 then ends (840).

Figure 9:
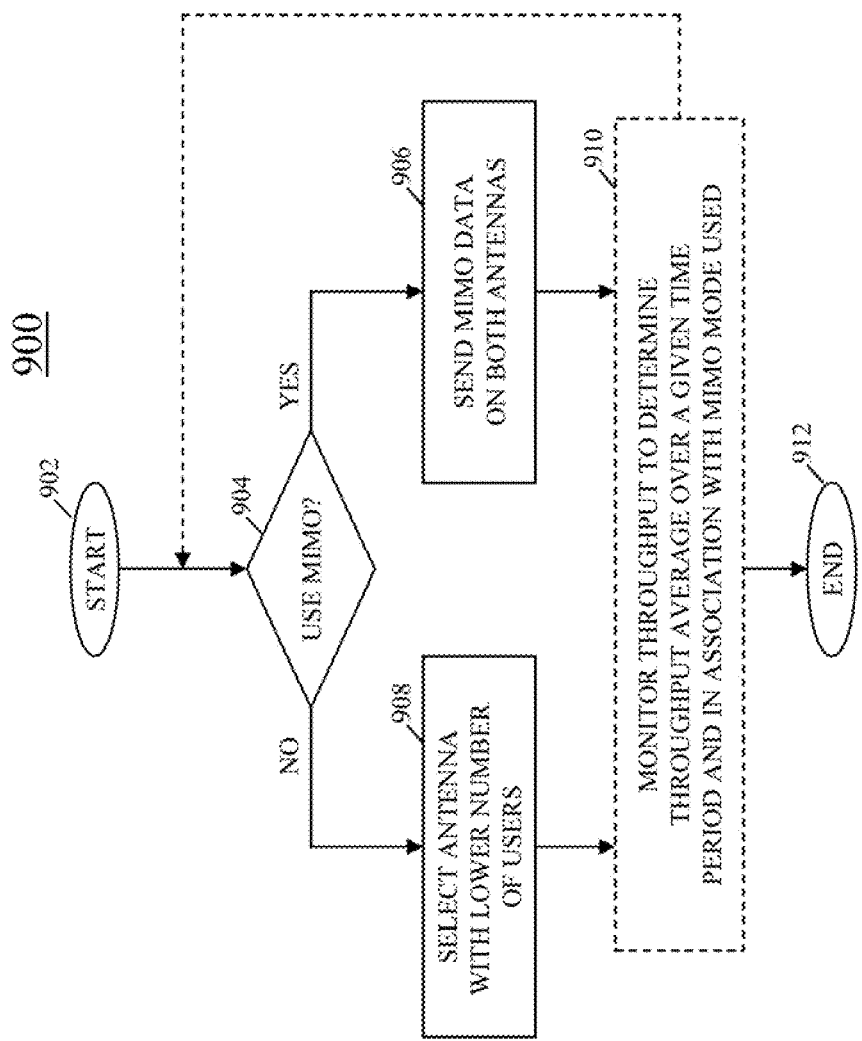
FIG. 9 is a logic flow diagram that illustrates a method executed by a base station of FIG. 1 for performing antenna selection for a downlink transmission in accordance with another embodiment of the present invention.

FIG. 9 is a logic flow diagram 900 illustrating a method executed by processor 402 of BS 120 for performing antenna selection for a downlink transmission to an UE in accordance with another embodiment of the present invention. The method of performing antenna selection depicted in logic flow diagram 900 may be used in conjunction with, or as an alternative to, the method of antenna selection depicted in logic flow diagram 800.

Logic flow diagram 900 begins (902) when BS 120 determines (904) whether to use MIMO for a transmission of user data, for example, whether an UE, such as UEs 102 and 103, supports MIMO. If the transmission will be a MIMO transmission, then the BS determines (906) to transmit the user data to the UE via each antenna of the multiple antennas 124, 126 of antenna array 122. If the transmission will not be a MIMO transmission, BS 120 then selects (908), for the subsequent transmission of user data, an antenna of antenna array 122, such as antenna 124, that has a least number of users relative to the other antenna(s) of the array. BS 102 may further monitor (910) transmissions to each UE, such as UEs 102 and 103, served by the BS to determine whether to switch between a MIMO and a non-MIMO mode of transmission to the UE, and logic flow diagram 900 then ends (912).

For example, with respect to step 910, BS 120 may monitor the throughput of every downlink transmission to a served UE, such as by monitoring a number of retransmissions of data or a number of acknowledgments (ACKs)/negative acknowledgments (NACKs) received from the UE, or may monitor downlink signal quality feedback received from the UE, such as Channel Quality Information (CQI). BS 120 then stores values associated with the throughput in the at least one memory device 404 of the BS. The manner in which the throughput is stored is up to a designer of system 100; for example, the BS may average the throughput over a given time period, $T_m$, to produce a throughput average and then store throughput averages for each of multiple time periods. BS 120 further stores, in association with each throughput average, an indication of whether or not MIMO was being used at that time to generate that throughput average. Based on the throughput averages stored over time, BS 120 then proceeds to step 904 and re-determines whether to use MIMO, that is, whether to change MIMO transmission modes for a transmission to the UE during a next scheduled transmission interval, such as a next radio frame or TTI (Transmission Time Interval). For example and assuming the UE supports MIMO, BS 120 may select a MIMO mode (that is, MIMO versus non-MIMO) for a next scheduled transmission interval that has, in a comparison of each mode's most recent transmission, yielded the best throughput average.

Thus a MIMO BS is provided that utilizes all RF amplifiers of a signal processing section regardless of whether a transmission is a MIMO or a non-MIMO transmission and performs antenna selection and sets a power gain for each antenna of an antenna array associated with the BS for a downlink transmission. By amplifying a non-MIMO signal using all of the multiple parallel amplifiers of the multi-channel transmitter, smaller, less costly amplifiers may be used in the transmitter than would be required if each transmit path of the transmitter had to have a amplifier large enough to singly amplify the non-MIMO signal. Further, the BS individually sets the power gain for each antenna of the antenna array based on RF conditions associated with that antenna, and further antenna selection is performed for a non-MIMO transmission based on one or more of RF conditions associated with each antenna and a number of users associated with each antenna. Thus, utilization of the antenna array is optimized for both MIMO and non-MIMO transmissions.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having," as used herein, are defined as comprising. The term "coupled," as used herein, is defined as connected, although not necessarily directly, and not necessarily mechanically. An element preceded by " . . . a" does not, without more constraints, preclude the existence of additional identical elements in the process, method, article, or apparatus that the element. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A Multiple-Input Multiple-Output (MIMO) base station comprising:
  a multi-channel transmitter comprising:
    an input Fourier Transform Matrix (FTM) having a plurality of input ports and a plurality of output ports that receives an input signal at one or more input ports of the plurality of input ports and, for each input signal received at an input port, routes at least a portion of the input signal to each output port of the plurality of output ports to produce a plurality of input FTM output signals;
    a signal processing section having plurality of amplifiers, wherein each amplifier of the plurality of amplifiers of the signal processing section receives an input FTM output signal of the plurality of input FTM output signals, amplifies the received input FTM output signal to produce an amplified signal, and routes the amplified signal to an input port of an output FTM, when an input signal is applied, during a non-MIMO transmission, to only one input port of the plurality of input ports of the input fourier transform matrix, then each of the amplifiers of the plurality of amplifiers amplifies the input signal;
    an output FTM having a plurality of input ports and a plurality of output ports, wherein each input port of the plurality of input ports of the output FTM receives a signal that has been amplified by an amplifier of the signal processing section and produces an output signal at an output port of the plurality of output ports based on the plurality of received amplified signals, wherein each output signal at an output port of the plurality of output ports of the output FTM is an amplified version of an input signal received at an input port of the plurality of input ports of the input FTM; and
    an antenna array comprising a plurality of antennas, wherein each antenna of the plurality of antennas is operably coupled to an output port of the plurality of output ports of the output FTM and receives the output signal produced at the output port for transmission to a user equipment, wherein the antenna array performs both MIMO and non-MIMO transmissions for a user equipment, and
  a processor that is configured to:
    determine whether a transmission to a user equipment will be a MIMO transmission;
    if the transmission to the user equipment will not be a MIMO transmission:
      determine one or more of a path gain, signal attenuation, or path loss associated with each antenna of the antenna array;

set a power gain of an antenna with one or more of the largest path gain, smallest signal attenuation, and smallest path loss, to a non-zero value; and set a power gain of the other antennas of the antenna array to zero; if the transmission to the user equipment will be a MIMO transmission:

set a power gain of each antenna of the plurality of antennas of the antenna array to a non-zero value.

2. The base station of claim 1, wherein when an input signal is applied to only one input port of the plurality of input ports of the input Fourier Transform Matrix, then the signal is transmitted via only one antenna of the plurality of antennas of the antenna array.

3. The base station of claim 1, wherein when each input port of the plurality of input ports of the input Fourier Transform Matrix (FTM) receives an input signal, then the amplified signal received at each antenna of the plurality of antennas of the antenna is an amplified version of the input signal received at one input port of the plurality of input ports of the input FTM.

4. The base station of claim 1,
wherein if the transmission to the user equipment will be a MIMO transmission:
determine whether the transmission will be a 'rank=1' transmission or a 'rank=2' transmission; and
set the power gain of each antenna of the plurality of antennas of the antenna array to non-zero value that is based on whether the transmission will be a 'rank=1' transmission or a 'rank=2' transmission.

5. The base station of claim 4, wherein the processor is configured to set the power gain of each antenna of the plurality of antennas of the antenna array to the non-zero value based on whether the transmission will be a rank=1 transmission or a rank=2 transmission by, when the transmission will be a rank=1, single stream transmission, setting a same power gain for each antenna of the antenna array.

6. The base station of claim 4, wherein the processor is configured to the power gain of each antenna of the plurality of antennas of the antenna array to the non-zero value based on whether the transmission will be a 'rank=1' transmission or a 'rank=2' transmission by, when the transmission will be a 'rank=1', single stream transmission:
determining one or more of a path gain, signal attenuation, or path loss associated with each antenna of the antenna array;
setting a power gain of an antenna with one or more of the largest path gain, smallest signal attenuation, and smallest path loss, to a non-zero value; and
setting a power gain of the other antennas of the antenna array to zero.

7. The base station of claim 4, the processor is configured to set the power gain of each antenna of the plurality of antennas of the antenna array to the non-zero value based on whether the transmission will be a 'rank=1' transmission or a 'rank=2' transmission by, when the transmission will be a 'rank=1', dual stream transmission:
determining one or more of a path gain, signal attenuation, or path loss associated with each antenna of the antenna array;
setting a power gain of a first antenna of the antenna array to a first value and setting a power gain of a second antenna of the antenna array to a second value, wherein the first antenna is associated with one or more of a larger path gain, a smaller signal attenuation, and a smaller path loss than the second antenna and wherein the second value is greater than the first value.

8. The base station of claim 4, wherein the processor is configured to set the power gain of each antenna of the plurality of antennas of the antenna array to the non-zero value based on whether the transmission will be a 'rank=1' transmission or a 'rank=2' transmission by, when the transmission will be a 'rank=2' transmission:
receiving codebook-based feedback from the user equipment; and
setting a power gain for each antenna of the antenna array based on the codebook-based feedback.

9. The base station of claim 4, wherein the processor is configured to set the power gain of each antenna of the plurality of antennas of the antenna array to the non-zero value based on whether the transmission will be a 'rank=1' transmission or a 'rank=2' transmission by, when the transmission will be a 'rank=2' transmission:
determining whether codebook-based feedback has been received from the user equipment;
when codebook-based feedback has not been received from the user equipment:
determining one or more of a path gain, signal attenuation, or path loss associated with each antenna of the antenna array; and
setting a power gain of a first antenna of the antenna array to a first value and setting a power gain of a second antenna of the antenna array to a second value, wherein the first antenna is associated with one or more of a larger path gain, a smaller signal attenuation, and a smaller path loss than the second antenna and wherein the second value is greater than the first value.

10. The base station of claim 1, wherein the processor is configured to:
monitor a throughput associated with the user equipment; and
determine whether to switch from one of a MIMO transmission and a non-MIMO transmission to a non-MIMO transmission and a MIMO transmission, respectively, based on the monitored throughput.

* * * * *